Figure 1:
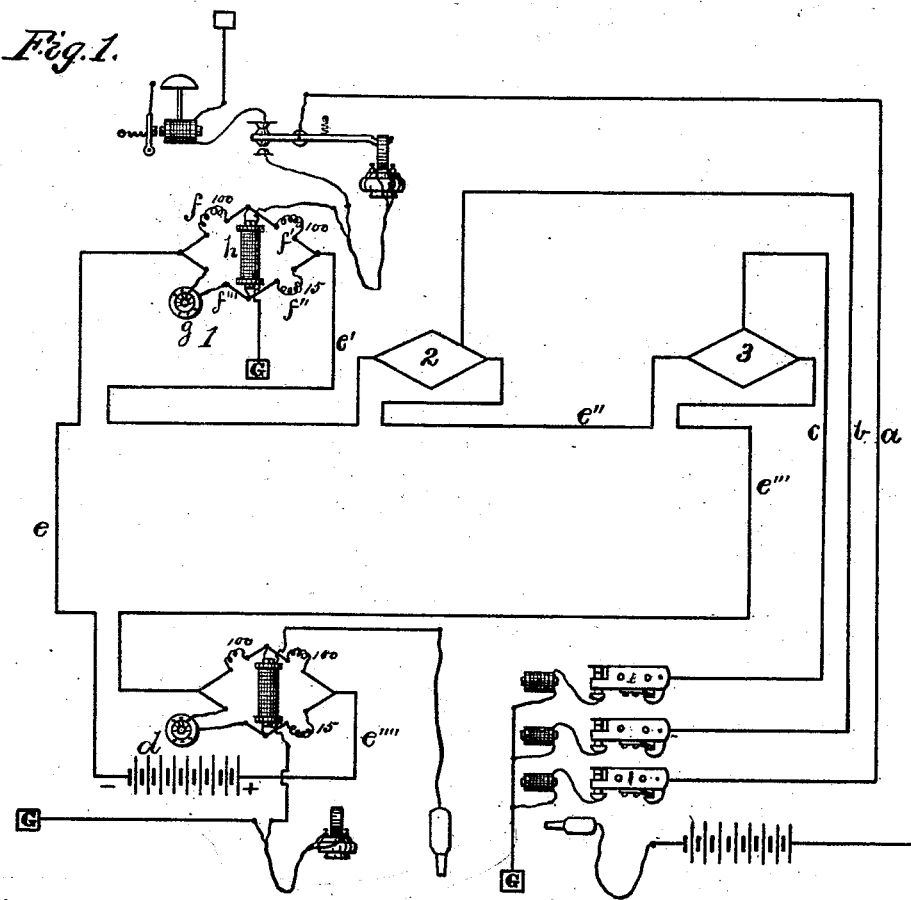

C. E. SCRIBNER.
Centralizing Individual Batteries of a Telephone.
Exchange.

No. 243,165. Patented June 21, 1881.

Witnesses.

Inventor.
Charles E. Scribner

UNITED STATES PATENT OFFICE.

CHARLES E. SCRIBNER, OF CHICAGO, ILLINOIS, ASSIGNOR TO THE WESTERN ELECTRIC MANUFACTURING COMPANY, OF SAME PLACE.

CENTRALIZING INDIVIDUAL BATTERIES OF A TELEPHONE-EXCHANGE.

SPECIFICATION forming part of Letters Patent No. 243,165, dated June 21, 1881.

Application filed April 4, 1881. (No model.)

*To all whom it may concern:*

Be it known that I, CHARLES E. SCRIBNER, of Chicago, Illinois, have discovered certain new and useful Improvements in Centralizing Individual Batteries of a Telephone-Exchange, of which the following is a full, clear, concise, and exact description.

Heretofore each subscriber has been provided with one or two elements of battery in the local circuit of his transmitter and the primary of his induction-coil.

By the use of my invention many or all of the subscribers of a system may use the same battery for their primary currents.

It has been impracticable heretofore to use the transmitters of several subscribers in the circuit of a single battery, since the resistance in the common line would be so great that the variation caused by the voice upon a single transmitter would not be sufficient to induce a distinct voice-current in the secondary of the induction-coil; and, moreover, if two should speak into their transmitters at once, great confusion would result.

I overcome these practical difficulties by means of a Wheatstone bridge placed at each subscriber's station in the circuit of the common battery. In one of the four arms of the bridge I place a battery-transmitter, which may be of the form known as the "Edison transmitter," or a microphone. The other arms of the bridge are balanced to the resistance of the transmitter by inserting resistance-coils. In the cross-wire of the Wheatstone bridge is placed the primary of the induction-coil, and, in consequence of the bridge being balanced, there will be no current passing through the cross-wire of the bridge and primary of induction-coil when the system is not in use. In addition to the circuit-wire to the subscribers, I run to each subscriber an individual wire for talking. This individual wire passes through a switch to the call-bell and to ground when the telephone-receiver is on the hook, or through the receiving-telephone and secondary of the induction-coil when the receiving-telephone is off from the hook. Speaking into the transmitter varies the resistance of that arm of the bridge in which the transmitter is inserted. This variation of the resistance of the one arm of the bridge causes the main battery-current to flow through the cross-wire of the bridge and through the primary of induction-coil in vibrations corresponding to the vibrations of the diaphragm of the transmitter, and by induction these vibrations are communicated to the individual wire, and thence to the distant station to which the individual wire may be connected.

There is in use in some cities a system known as the "police telephone-call." In this system boxes are placed at intervals along the streets convenient to the policemen on their beats. A single wire connects all of these boxes to a central office, where there is kept constantly a watchman to send additional force of police in case of trouble, or to send assistance in case of an accident. The local batteries operating the telephones in these boxes are continually exposed to the cold, and consequently freeze. It is therefore necessary that this battery be placed at a central point, where it can be properly cared for.

In the drawings, Figure 1 is a diagram of a central-office outfit and a subscriber's outfit in detail, with the circuit of the battery passing through two other subscribers' stations.

The subscribers' stations 1, 2, and 3 are provided with telephone-lines $a$ $b$ $c$, which run to the switch-board at the central office, and from their respective switches through calling-annunciators and to ground in the usual manner. The circuit may be traced from the negative pole of battery $d$, as indicated by line $e$, through station 1, and by line $e'$ through station 2, and thence by line $e''$ through station 3, and by line $e'''$ through the outfit at the central office, and thence by line $e''''$ to the positive pole of the battery.

I place resistance-coils in the three arms $f f'$ $f''$ of the bridge, and place transmitter $g$ in the arm $f'''$. The resistance of the four arms is so adjusted that the bridge is balanced; hence there is normally no current through the primary of the induction-coil $h$, which is placed in the cross-wire of the bridge.

Figure 2:
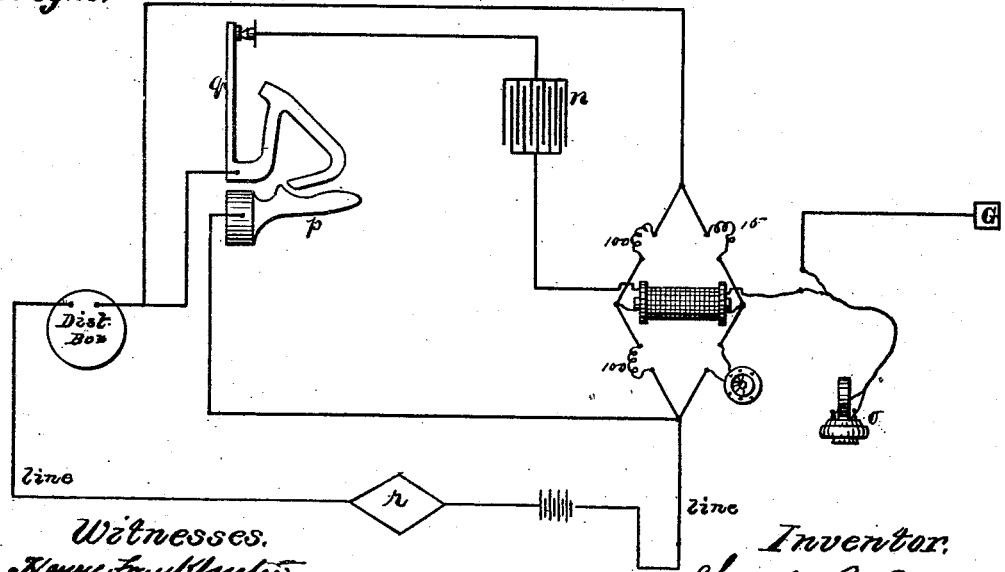

For private lines it may be convenient to use a portion of the line which forms the circuit of the common battery for talking. This may be done as indicated in Fig. 2, in which the circuit of the common battery may pass through a number of stations. I provide a condenser, n, so that there may be no escape of the battery-current to ground when two stations are connected for conversation.

When the telephone o is removed from the hook p of the switch the circuit of the telephone may be traced, as shown, from the ground G through the secondary of the induction-coil to the condenser n, and from the condenser to the switch-lever q, and thence, by a portion of the line which forms the circuit of the battery, to the station r, where in like manner the circuit is completed to ground through a condenser, the secondary of an induction-coil, and a receiving-telephone.

I claim—

1. A group of individual telephone-circuits connecting the subscribers' stations and the central office in any well-known way, in combination with a battery-circuit common to the transmitters of two or more of the group and the primaries of the induction-coils, the said coils being placed in the circuits of the cross-wires of the Wheatstone bridges or balances, substantially as and for the purpose specified.

2. The combination of a Wheatstone bridge or balance with a transmitter and induction-coil, said transmitter and induction-coil being placed in the lines of the bridge, substantially as shown and described.

3. The Wheatstone bridge or balance and condenser at each subscriber's station, in combination with the circuit of a common battery, and mechanism whereby a portion of the common battery-circuit may be used as a circuit for induced voice-currents, substantially as shown and described.

CHARLES E. SCRIBNER.

Witnesses:
WILLIAM S. GRANGER,
GEORGE R. BARTON.